US007859812B2

(12) United States Patent
Chen et al.

(10) Patent No.: US 7,859,812 B2
(45) Date of Patent: Dec. 28, 2010

(54) POWER IC WITH AN OVER-CURRENT PROTECTION CIRCUIT AND METHOD THEREOF

(75) Inventors: Chia-Min Chen, Hsinchu (TW); Ming-Hong Jian, Hsinchu (TW)

(73) Assignee: Holtek Semiconductor Inc., Hsinchu (TW)

(*) Notice: Subject to any disclaimer, the term of this patent is extended or adjusted under 35 U.S.C. 154(b) by 428 days.

(21) Appl. No.: 12/081,956

(22) Filed: Apr. 24, 2008

(65) Prior Publication Data

US 2009/0195953 A1 Aug. 6, 2009

(30) Foreign Application Priority Data

Feb. 1, 2008 (TW) .............................. 97104068 A

(51) Int. Cl.
*H02H 7/00* (2006.01)

(52) U.S. Cl. ..................................................... 361/93.9

(58) Field of Classification Search ................. 361/93.9
See application file for complete search history.

(56) References Cited

U.S. PATENT DOCUMENTS 4,394,703 A * 7/1983 Butcher ...................... 361/101
4,792,745 A * 12/1988 Dobkin ....................... 323/269
7,038,436 B2 * 5/2006 Goto et al. .................. 323/282

* cited by examiner

*Primary Examiner*—Stephen W Jackson
(74) *Attorney, Agent, or Firm*—Rosenberg, Klein & Lee

(57) ABSTRACT

A power IC with an over-current protection receives an input voltage and converts the input voltage into an output voltage to a load. The present invention controls a power transistor to provide an output current to the load, and uses the output control unit to control the power transistor. Furthermore, the over-current protection circuit has a constant current limit threshold and a fold-back current limit threshold for controlling the power transistor. When the output current is larger than the constant current limit threshold, the output current is clamped to a constant current value to descend the output voltage to a rated value. When the output current is larger than the fold-back current limit threshold, the output current is limited to a low current value to descend the output voltage to zero. Thereby, the inner circuit of the power IC and the load are protected.

15 Claims, 7 Drawing Sheets

POWER IC WITH AN OVER-CURRENT PROTECTION CIRCUIT AND METHOD THEREOF

BACKGROUND OF THE INVENTION

1. Field of the Invention

The present invention relates to a power IC and an over-current protection circuit and method thereof. In particular, this invention relates to a power IC and an over-current protection circuit and method thereof that has a two-stage current limit protection mechanism.

2. Description of the Related Art

As technology develops, a variety of advanced electronic devices are produced. In addition to enhancing functionality of the circuits of the electronic devices, a great amount of efforts are exerted to the power circuit—the power IC, such as voltage regulators, that will affect the stability of the electronic devices.

The voltage regulator is a circuit that provides a constant voltage to the load. The output current of the voltage regulator is adjusted according to the resistance of the load so that the output voltage is maintained at a constant voltage. The characteristic of the voltage regulator depends on the electronic devices, such as the consumer electronic devices, or the portable electronic devices, etc. For example, low input-output voltage difference, high (low) output power, low quiescent current, low noise, or high power supply rejection to meet the requirements of the electronic devices. Therefore, in order to prevent the output current from being too large, or prevent the circuit from being damaged due to the output terminal is short-circuit, an over-current protection circuit is designed in the power IC so that the power IC is operated in a safe and stable status.

The power ICs with an over-current protection of the prior art can be divided into the following ways.

First, reference is made to FIG. 1, which shows a circuit diagram of the power IC with an over-current protection of the first way of the prior art. The over-current protection circuit 9 includes a current limit switch transistor Q1 and a sensing resistor R1. Because the output current flows through the sensing resistor R1, the resistance of the resistor R1 can be designed according the voltage over the sensing resistor R1. When the output current surpasses the specified value, the current-limit switch transistor Q1 is conducted to limit the output current. In other words, when the output current increases, the voltage over the sensing resistor R1 also increases so that the current limit switch transistor Q1 conducts current. Furthermore, the reference current source generates a bias current $I_1$, and is connected with the collector terminal of the current-limit switch transistor Q1. Thereby, the driving current $I_2$ flowing into the base terminal of the current limit switch transistor Q2 decreases. Therefore, when the output current surpasses the specified value, the output current is limited.

However, the over-current protection circuit 9 has two drawbacks. First, because the output current flows through the sensing resistor R1, the voltage over the sensing resistor R1 is too large when the output current is large, and a great amount power is lost on the sensing resistor R1. Therefore, there is a larger voltage difference between the input voltage $V_{DD}$ and the output voltage $V_{OUT}$. Secondly, the over-current protection circuit 9 is sensitive for the temperature. Because the base-emitter voltage Vbe of the current limit switch transistor Q1 has a negative temperature coefficient and the sensing resistor R1 has a positive temperature coefficient, the default current limit threshold decreases due to the temperature increases.

Secondly, reference is made to FIG. 2, which shows a circuit diagram of the power IC with an over-current protection of the second way of the prior art. The power IC is composed of an over-current protection circuit 9' and a voltage-regulating circuit. The voltage-regulating circuit includes an error amplifier EA, a power transistor $M_1$, a feedback resistor net $R_{F1}$ and $R_{F2}$, and a reference voltage source $V_{REF}$. When the load current of the output terminal of the voltage-regulating circuit increases (or decreases), the output voltage $V_{OUT}$ descends (or ascends). At this time, the feedback resistor net $R_{F1}$ and $R_{F2}$ outputs the variation of the output voltage $V_{OUT}$ to the input terminal of the error amplifier EA, and compares the output voltage $V_{OUT}$ with the reference voltage source $V_{REF}$. Thereby, the error amplifier EA generates a control signal to control the magnitude of the biasing current $I_3$ of the power transistor $M_1$ to regulate the output voltage $V_{OUT}$.

The over-current protection circuit 9' includes a sensing transistor $M_2$, a plurality of transistors $M_3$, $Q_3$, $Q_4$, $Q_5$, $Q_6$, a reference current $I_4$ and a capacitor $C_1$. The current flowing through the power transistor $M_1$, will generate a sensing current via the sensing transistor $M_2$. The sensing current flows through the transistor $Q_4$ and then is mapped to the transistor $Q_3$. The reference current $I_4$ provided by the current source is mapped to the transistor $Q_6$ via the transistor $Q_5$. The capacitor $C_1$ is used as a compensation capacitor to prevent the collectors of the transistors $Q_3$ and $Q_6$ from generating an oscillation symptom. When the load current is too large and surpasses the current limit threshold, the current mapped to the transistor $Q_3$ increases so that the voltage over the input voltage $V_{DD}$ and the point A increases to conduct the transistor $M_3$ and drive the gate voltage of the power transistor $M_1$ to a high level voltage. Thereby, the output current of the power transistor $M_1$ is limited.

However, the over-current protection circuit 9' has the following drawbacks. First, there is no fold-back current limit. When the output terminal is short-circuit, a great amount of heat loss occurs. In addition to wasting power, the power transistor $M_1$ may be damaged when the voltage difference between the input voltage and the output voltage is large. Secondly, because the circuit needs a compensation capacitor, the area of the power IC is increased.

SUMMARY OF THE INVENTION

One particular aspect of the present invention is to have a two-stage current limit mechanism, including the constant current limit and the fold-back current limit, in the over-current protection circuit. Thereby, the output current of a power IC with the over-current protection circuit is clamped to a specified value to prevent the over-current from being occurred and decrease the power loss and heat loss generated by the power transistor when the output terminal is short-circuit. Therefore, the circuit in the power IC and the load connected with the output terminal are protected.

A power IC with an over-current protection is provided for receiving an input voltage and converting the input voltage into an output voltage for a load. The power IC with an over-current protection includes a power transistor, a feedback circuit, an output control unit, and an over-current protection circuit. The power transistor provides an output current to the load. The feedback circuit detects the output voltage to generate a feedback signal. The output control unit receives the feedback signal and calculates the feedback signal and a reference voltage source to generate a voltage control signal to control the power transistor. The over-current protection circuit includes a constant current limit threshold and a fold-back current limit threshold for controlling the power transistor to adjust the output voltage and the output current. When the output current is larger than the constant current limit threshold, the over-current protection circuit clamps the output current to a constant current value to lower the output voltage to a rated value. When the output current is larger than the fold-back current limit threshold, the over-current protection circuit limits the output current to a low current value to lower the output voltage to zero.

The present invention also provides an over-current protection circuit that is applied to a power IC. The power IC receives an input voltage and controls a power transistor to output an output voltage and output current according to a feedback signal of a feedback circuit. The over-current protection circuit includes a constant current limit circuit and a fold-back current limit circuit. The constant current limit circuit has a constant current limit threshold and includes a sensing transistor, a switch transistor, and a voltage level control unit. The sensing transistor senses the current flowing through the power transistor to form a sensing current. The switch transistor is used as a turn-on/turn-off switch of the over-current protection circuit. The voltage level control unit shifts the voltage level according to the sensing current and a bias current to control the switch transistor. The fold-back current limit circuit has a fold-back current limit threshold and cooperates with the constant current limit circuit according to a divided voltage generated from the feedback circuit. When the output current is larger than the constant current limit threshold, the constant current limit circuit clamps the output current to a constant current value to lower the output voltage to a rated value. When the output current is larger than the fold-back current limit threshold, the fold-back current limit circuit limits the output current to a low current value to lower the output voltage to zero.

The present invention also provides an over-current protection method that is applied to a power IC. The power IC receives an input voltage and controls a power transistor to output an output voltage and output current according to a feedback signal of a feedback circuit. The over-current protection method includes the following steps. First, the output voltage is stably outputted to fix the output current of the power transistor. Next, the output current is detected. When the detected output current is larger than a fold-back current limit threshold, the power transistor is controlled to limit the output current to a low current value to lower the output voltage to zero. When the detected output current is larger than a constant current limit threshold, the power transistor is controlled to clamp the output current to a constant current value to lower the output voltage to a rated value.

Thereby, when the over-current or the short-circuit occurs, the circuit in the power IC and the load circuit of the output terminal are protected. Furthermore, in addition to achieve the over-current protection and short-circuit protection, the area of the power IC is reduced in the CMOS manufacturing process due to the required components is reduced.

For further understanding of the invention, reference is made to the following detailed description illustrating the embodiments and examples of the invention. The description is for illustrative purpose only and is not intended to limit the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

The present invention has a two-stage current limit mechanism, including the constant current limit and the fold-back current limit, in the over-current protection circuit. Thereby, a power IC with the over-current protection circuit will not generate the over-current symptom and decrease the power loss and heat loss generated by the power transistor when the output terminal is short-circuit. Therefore, the circuit in the power IC and the load connected with the output terminal are protected.

Figure 1:
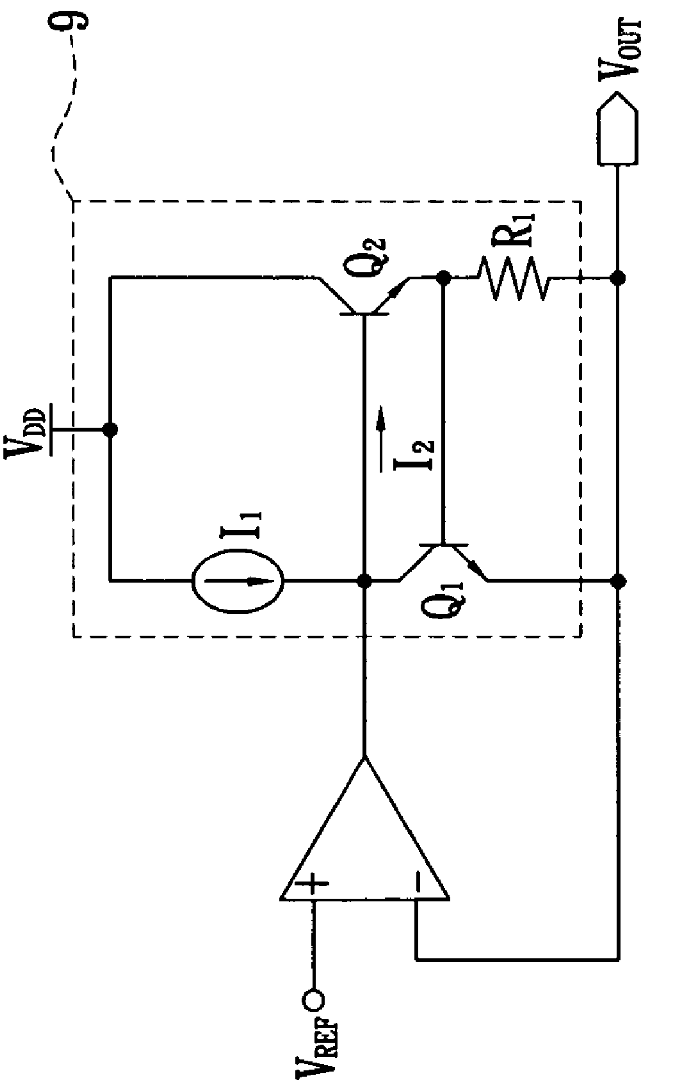
FIG. 1 PRIOR ART
FIG. 1 is a circuit diagram of the power IC with an over-current protection of the first way of the prior art.
Figure 2:
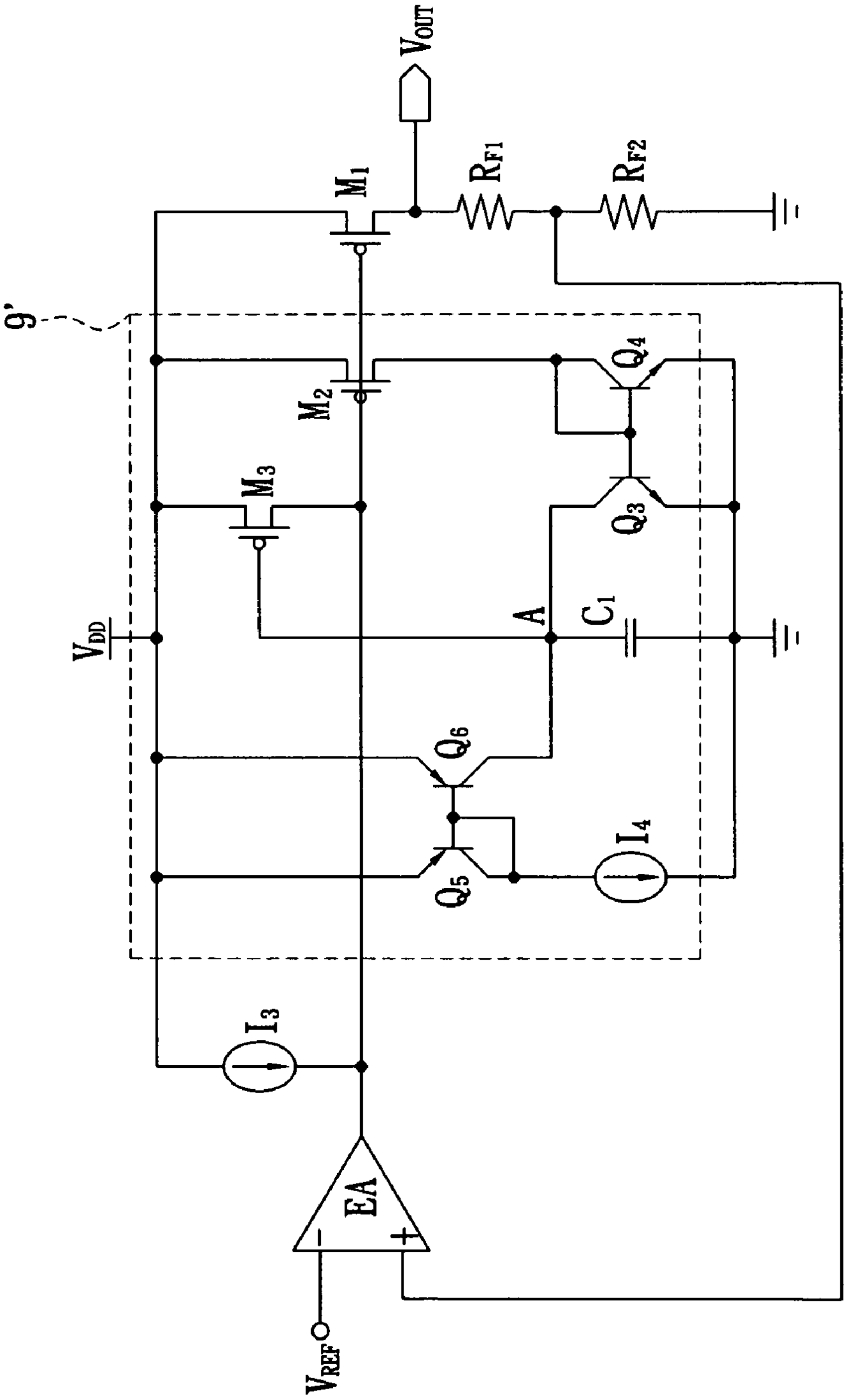
FIG. 2 PRIOR ART
FIG. 2 is a circuit diagram of the power IC with an over-current protection of the second way of the prior art.
Figure 3:
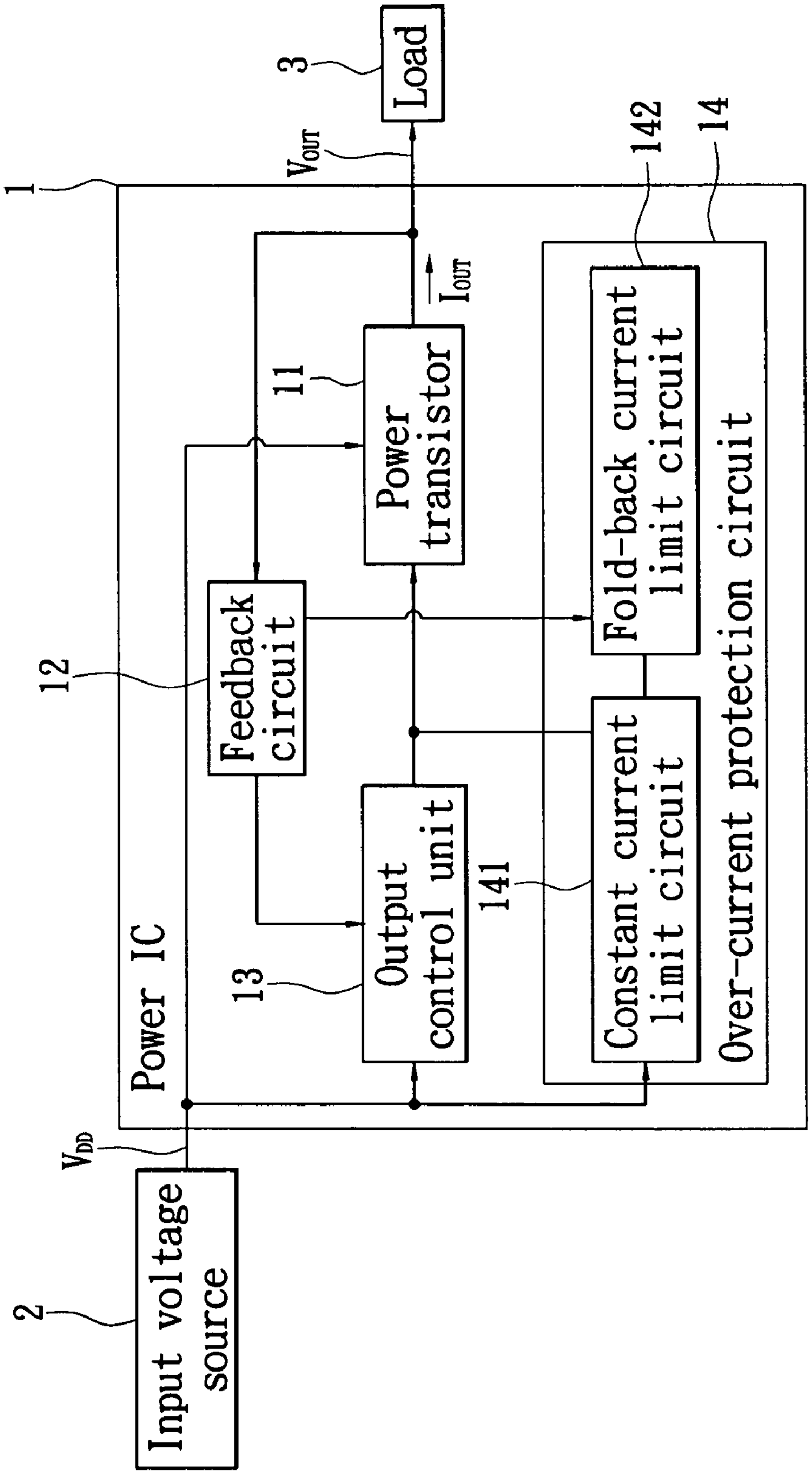
FIG. 3 is a block diagram of the power IC with an over-current protection of an embodiment of the present invention.

Reference is made to FIG. 3, which shows a block diagram of the power IC with an over-current protection of an embodiment of the present invention. In this embodiment, a power IC 1 is provided for receiving an input voltage $V_{DD}$ generated from an input voltage source 2 and converting the input voltage $V_{DD}$ into an output voltage $V_{OUT}$ for load 3 in a normal operation status. The power IC 1 includes a power transistor 11, a feedback circuit 12, an output control unit 13, and an over-current protection circuit 14. The power transistor 11 receives the input voltage $V_{DD}$ and is controlled by the output control unit 13 to provide an output current $I_{OUT}$ to the load 3. The feedback circuit 12 detects the output voltage $V_{OUT}$ to generate a feedback signal. The output control unit 13 has a reference voltage source (not shown in the figure) and receives the feedback signal and calculates the feedback signal and the reference voltage source to generate a voltage control signal to control the power transistor 11.

The over-current protection circuit 14 includes a constant current limit circuit 141 and a fold-back current limit circuit 142. The constant current limit circuit 141 is designed with a constant current limit threshold by utilizing a circuit-matching. The fold-back current limit circuit 142 is designed with a fold-back current limit threshold by utilizing a circuit-matching so that the over-current protection circuit 14 can control the power transistor 11 to adjust the output voltage $V_{OUT}$ and the output current $I_{OUT}$.

Therefore, when the output current $I_{OUT}$ is larger than the constant current limit threshold, the over-current protection circuit 14 clamps the output current $I_{OUT}$ to a constant current value to lower the output voltage $V_{OUT}$ to a rated value. The clamped constant current value is designed according to the power IC 1 to prevent the over-current from being occurred. The magnitude of the constant current value is not limited to above. The output voltage $V_{OUT}$ is maintained to the rated value that is directly calculated from the constant current value.

Furthermore, when the output current $I_{OUT}$ is larger than the fold-back current limit threshold, the over-current protection circuit 14 limits the output current $I_{OUT}$ to a low current value to lower the output voltage $V_{OUT}$ to zero. The fold-back current limit threshold is designed according to an estimated short-circuit current. When the output current $I_{OUT}$ surpasses the fold-back current limit threshold, the load 3 of the output terminal is short-circuit.

Figure 4:
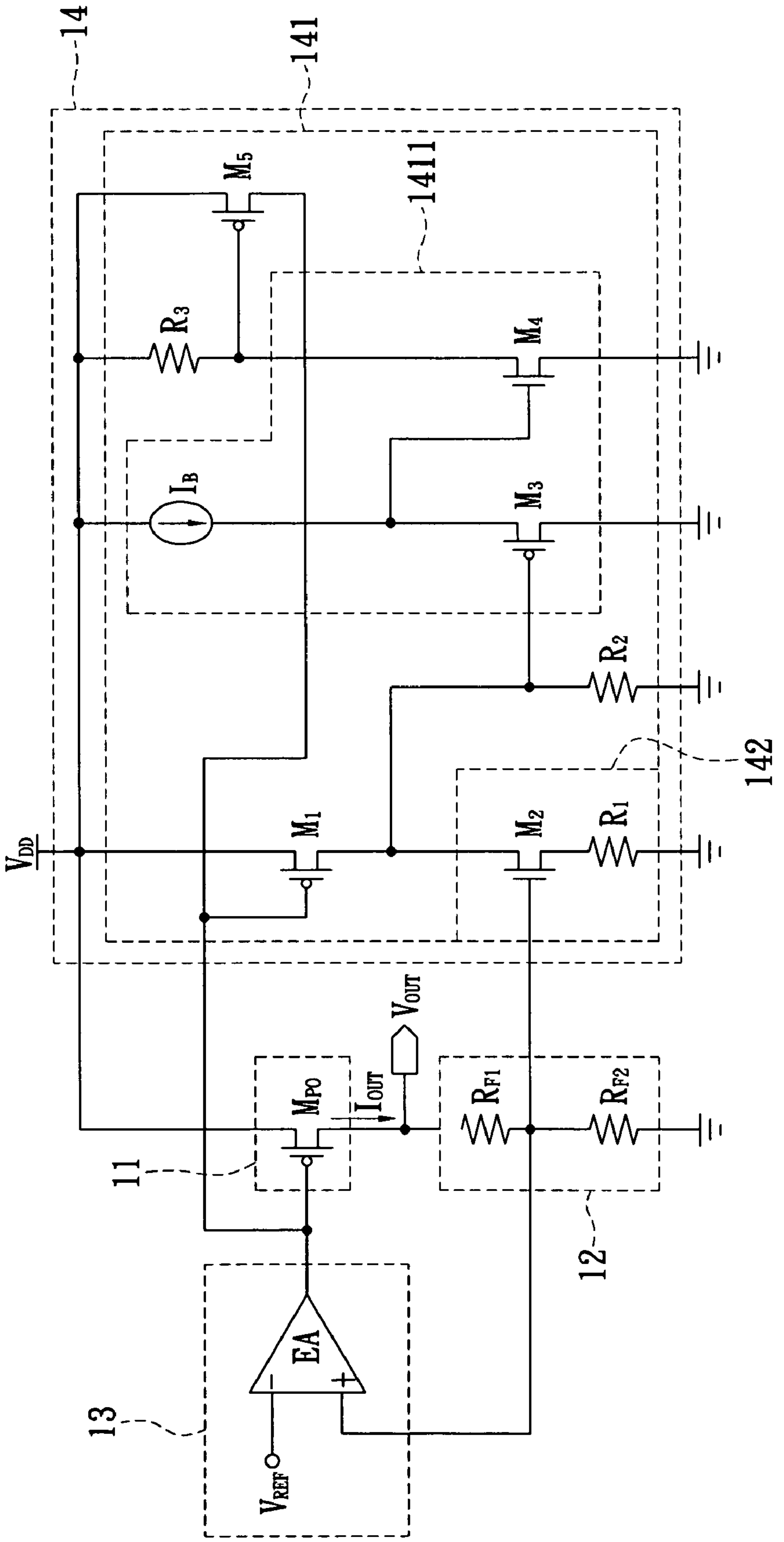
FIG. 4 is a circuit diagram of the power IC with an over-current protection of an embodiment of the present invention.

Reference is made to FIG. 4, which shows a circuit diagram of the power IC with an over-current protection of an embodiment of the present invention. The circuit of the block diagram in FIG. 3 is illustrated. The circuit is used for implementing the power IC of the voltage regulator.

The power transistor ($M_{PO}$) 11 is a P-channel MOSFET (PMOS). The feedback circuit 12 is composed of the resistors $R_{F1}$ and $R_{F2}$ that form a feedback resistor net, and is used for detecting the output voltage $V_{OUT}$.

In this embodiment, the output control circuit 13 includes the error amplifier EA and the reference voltage source $V_{REF}$. The output control circuit 13, the feedback circuit 12 and the power transistor ($M_{PO}$) 11 form a negative feedback control. A non-inverted terminal of the error amplifier EA receives the feedback signal generated from the feedback circuit 12. An inverted terminal of the error amplifier EA is connected with the reference voltage source $V_{REF}$, and calculates the feedback signal and the reference voltage source $V_{REF}$ with an error amplifying operation to generate the voltage control signal.

When the output voltage $V_{OUT}$ of the power IC 1 changes, the feedback circuit 12 detects the variation of the output voltage $V_{OUT}$, and transmits the variation to the non-inverted terminal of the error amplifier EA. The error amplifier EA calculates the variation and the reference voltage source $V_{REF}$ in the inverted terminal to generate the voltage control signal to control the gate terminal of the power transistor $M_{PO}$. This means that the amplitude of the output current $I_{OUT}$ outputted from the power transistor $M_{PO}$ is controlled, and the output voltage of the voltage regulator is fixed at a constant voltage level.

The over-current protection circuit 14 includes the constant current limit circuit 141 and the fold-back current limit circuit 142. The constant current limit circuit 141 at least includes a sensing transistor $M_1$, a voltage level control unit 1411, a switch transistor $M_5$, and sensing transistors $R_2$, $R_3$. The voltage level control unit 1411 includes a bias current $I_B$ and transistors $M_3$, $M_4$. The fold-back current limit circuit 142 includes a transistor $M_2$ and a resistor $R_1$, and cooperates with the constant current limit circuit 141 to control the power transistor $M_{PO}$. The operation and the connection relation of the circuit in FIG. 4 are illustrated as below.

In the circuit principle, the output current $I_{OUT}$ provided to the load 3 from the voltage regulator is almost equal to the current flowing through the power transistor $M_{PO}$. Merely a tiny amount of current flows through the feedback circuit 12. The sensing transistor $M_1$ and the power transistor $M_{PO}$ has a common-source connection and is controlled by the same gate, and is used for sensing the current flowing through the power transistor $M_{PO}$ to generate a sensing current.

The sensing current generated from the sensing transistor $M_1$ will flow through the transistor $M_2$ and the resistor $R_2$. Therefore, a voltage drop is generated between the resistor $R_2$ to form the gate voltage level of the transistor $M_3$. In this embodiment, the current flowing through the transistor $M_2$ is larger than the current flowing through the resistor $R_2$.

In the voltage level control unit 1411, by utilizing the transistor $M_3$ and the bias current $I_B$, the voltage level control unit 1411 performs a voltage level shift according to the sensing current and the bias current $I_B$. This means that the voltage level of the source of the transistor $M_3$ is equal to the sum of the voltage over the resistor $R_2$, the threshold voltage of the transistor $M_3$ and the overdrive voltage of the transistor $M_3$. Next, the voltage of the source of the transistor $M_3$ is used for controlling the gate of the transistor $M_4$. After the transistor $M_4$ is conducted, the current flowing through the transistor $M_4$ will flow through the resistor $R_3$. The voltage drop over the resistor $R_3$ can form a source-gate voltage to turn on or turn off the switch transistor $M_5$. Thereby, the switch transistor $M_5$ is controlled.

Because the switch transistor $M_5$ is used as a switch of the over-current protection circuit 14, the switch transistor $M_5$ is conducted to enable the current limit mechanism in the over-current protection circuit 14 when the source-gate voltage of the switch transistor $M_5$ is surpasses the threshold voltage of the transistor $M_5$. In the constant current limit circuit 141, by utilizing the circuit matching, the constant current limit threshold for the output current $I_{OUT}$ is designed.

Therefore, when the output current $I_{OUT}$ increases, the current flowing through the transistor $M_2$ and the resistor transistor $R_2$ also increases so that the gate voltage of the transistors $M_3$, $M_4$ increases. Therefore, the current flowing through the transistor $M_4$ and the resistor $R_3$ increase so that the voltage drop over the resistor $R_3$ increases. When the output current $I_{OUT}$ surpasses the constant current limit threshold, the source-to-gate voltage of the switch transistor $M_5$ is larger than the threshold voltage in the specification of the switch transistor $M_5$ to conduct the switch transistor $M_5$. Therefore, the gate voltage of the power transistor $M_{PO}$ is not continuously decreased and is maintained at a constant value so that the output current $I_{OUT}$ is clamped to a constant current value and the output voltage $V_{OUT}$ descends to a rated value. The above mechanism is the current limit protection when the constant current limit mechanism is operated in a normal operation.

For the fold-back current limit circuit 142, because the gate terminal of the transistor $M_2$ is connected with the feedback terminal of the feedback circuit 12 and this feedback terminal is a voltage-divided terminal of the output voltage $V_{OUT}$, the short-circuit protection can be implemented according to the magnitude of the output voltage $V_{OUT}$. In the fold-back current limit circuit 142, the transistor $M_2$, the resistors $R_1$, $R_2$ are used for determining the fold-back current limit threshold for the fold-back current limit circuit 142 to fold back the current. The fold-back current limit threshold is determined according to the estimated short-circuit current of the voltage regulator. This means that the output terminal is short-circuit when the current surpasses the fold-back current limit threshold.

Therefore, when the output voltage $V_{OUT}$ descends so that the gate voltage of the transistor $M_2$ descends to turn off the transistor $M_2$, the current that originally flows through the transistor $M_2$ will flow through the resistor $R_2$. The gate voltage of the transistor $M_3$ continuously increases and the gate voltage of the transistor $M_4$ also continuously increases. Therefore, the current flowing through the transistor $M_4$ and the resistor $R_3$ continuously increases so that the voltage drop over the resistor $R_3$ continuously increases. At the time, the switch transistor $M_5$ continuously pull the gate voltage of the power transistor $M_{PO}$ to a high level so that the output current $I_{OUT}$ generated from the power transistor $M_{PO}$ will fold back and continuously descends and limited at a low current value and the output voltage $V_{OUT}$ descends to zero. The above mechanism is the current limit protection when the fold-back current limit mechanism is operated in a normal operation. Thereby, when the short-circuit current generates, the power loss and the heat loss of the power transistor $M_{PO}$ can be substantially decreased, and the inner circuit of the voltage regulator and the circuit of the load 3 are protected.

Because the present invention is implemented by the transistors and the over-current protection circuit 14 can separate the control signal, the recovery time of the output of the power IC is short when the over-current or the short-circuit is eliminated so that the output voltage $V_{OUT}$ is rapidly recovered to the normal status. Furthermore, the When the circuit is operated in a normal operation, the over-current protection circuit 14 does not affect the operation of the power IC 1.

Figure 5:
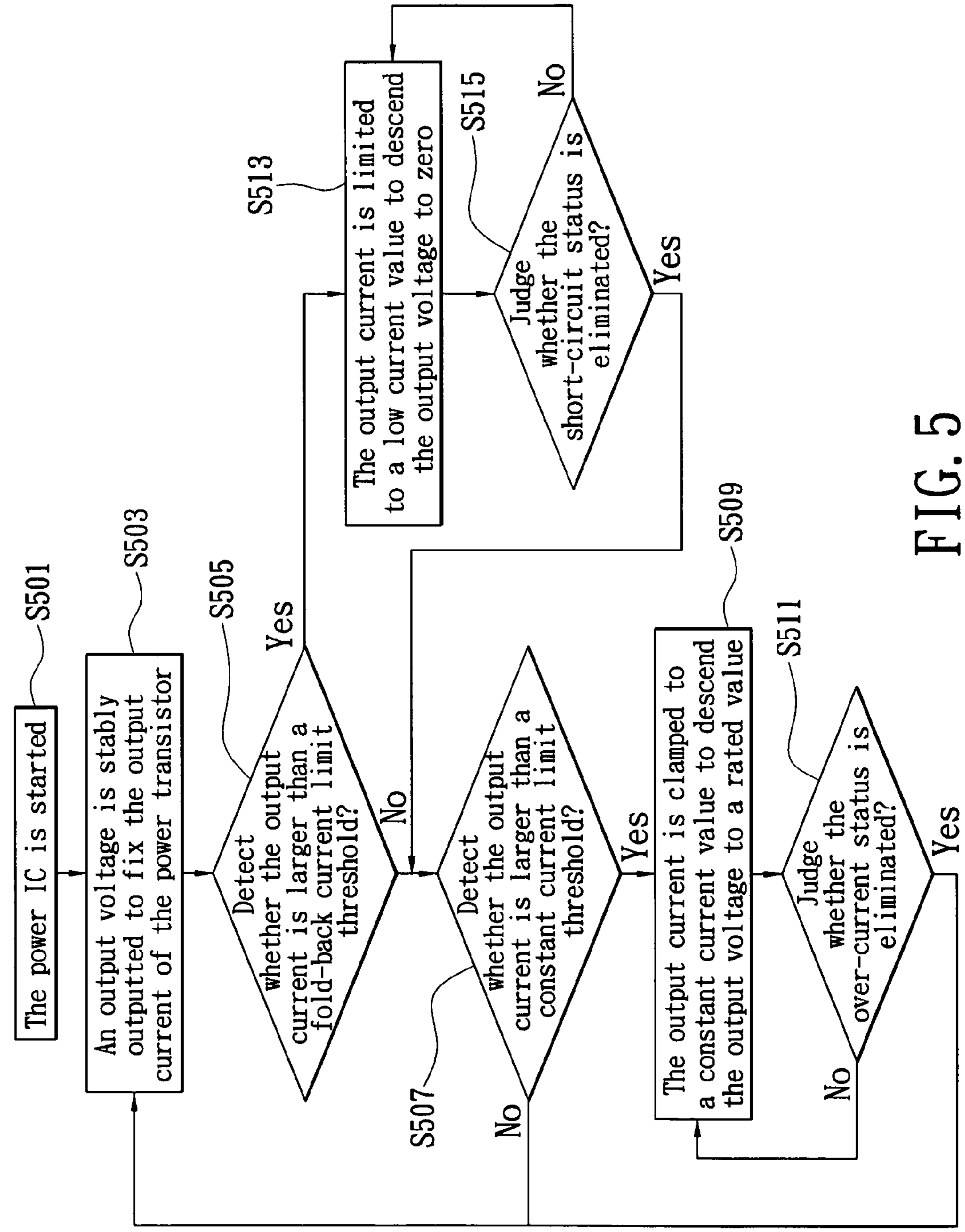
FIG. 5 is a flow chart of the over-current protection method of the present invention.

In order to illustrate the over-current protection circuit 14 in the power IC 1 in detail, reference is made to FIG. 5 which shows a flow chart of the over-current protection method of the present invention. The over-current protection method includes the following steps. First, the operation of the power IC 1 is turned on (S501) to stably output the output voltage $V_{OUT}$ in a normal operation to fix the output current $I_{OUT}$ of the power transistor 11 (S503).

Next, the output current $I_{OUT}$ is detected to determine whether the output current $I_{OUT}$ is larger than a fold-back current limit threshold (S505) to judge whether the circuit of the load 3 at the output terminal is short-circuit when the power IC 1 is turned on. When the detection result of step S505 is negative, this means that no circuit-short status occurs. Then, the output current $I_{OUT}$ is detected to determine whether the output current $I_{OUT}$ is larger than a constant current limit threshold (S507). At this time, when the detection result of step S507 is positive, this means that the over-current status occurs and the over-current protection mechanism is started and the output current $I_{OUT}$ is clamped to a constant current value via the constant current limit circuit 141. The output voltage $V_{OUT}$ is descended to a rated value (S509). Next, whether the over-current status is eliminated is continuously judged (S511). If the over-current status is not eliminated, the output current $I_{OUT}$ is continuously clamped to a constant current value to descend the output voltage $V_{OUT}$. If the judging result of step S511 is positive, this means that the over-current status has been eliminated. Therefore, the power IC is rapidly recovered to stably output the output voltage $V_{OUT}$ and output the output current $I_{OUT}$ to the load 3.

When the detection result of step S505 is positive, this means that the short-circuit status occurs. The fold-back current limit circuit 142 is used for limiting the output current $I_{OUT}$ to a low current value to descend the output voltage $V_{OUT}$ to zero (S513). Next, the whether the short-circuit status is eliminated is continuously judged (S515). Similarly, if the short-circuit status is not eliminated, the output current $I_{OUT}$ is continuously limited to a low current value to descend the output voltage $V_{OUT}$ to zero.

Because the fold-back current limit circuit 142 is used for preventing the power IC from being damaged due to short-circuit current, the fold-back current limit threshold is larger than the constant current limit threshold. Therefore, when the output current $I_{OUT}$ is larger than the fold-back current limit threshold, step S507 is performed to check whether the over-current status occurs due to the output current $I_{OUT}$ is larger than the constant current limit threshold after the short-circuit status is eliminated. Finally, by repeating the steps, the over-current protection method is implemented.

Next, by utilizing the output relation between the output voltage $V_{OUT}$ and the output current $I_{OUT}$, the effect of the present invention is illustrated.

Figure 6:
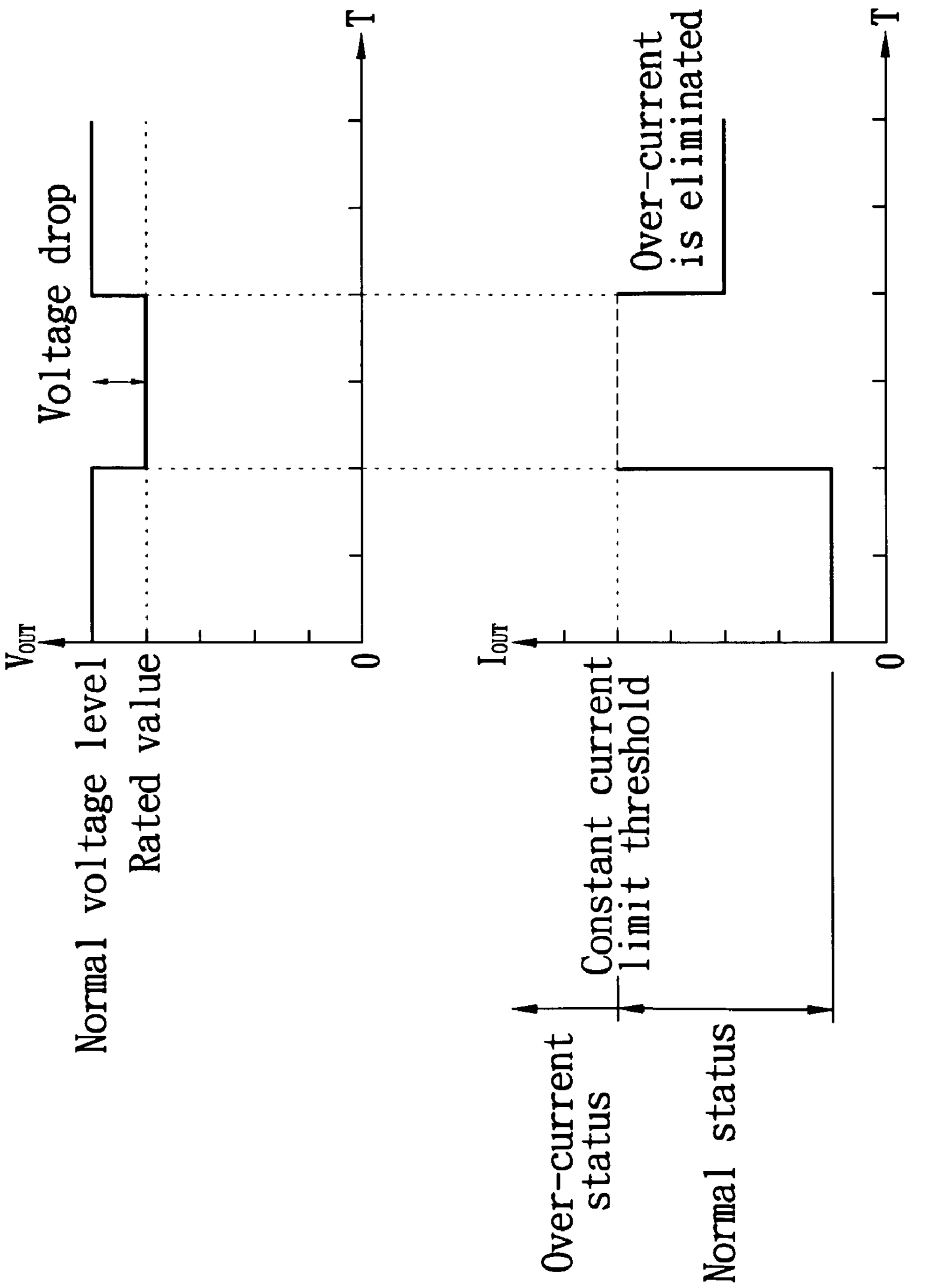
FIG. 6 is a schematic diagram of the transient status analysis of the output status when the constant current limit mechanism is operated.

Reference is made to FIG. 6, which shows a schematic diagram of the transient status analysis of the output status when the constant current limit mechanism is operated. As shown in FIG. 6, when the output current $I_{OUT}$ changes its status from the normal status to the over-current status (the output current $I_{OUT}$ is larger than the constant current limit threshold), the constant current limit mechanism is started to clamp the output current $I_{OUT}$ at a constant current value (in this embodiment, the constant current value is the same as the constant current limit threshold). The output voltage $V_{OUT}$ is maintained at a rated value due to the voltage drop is generated. Therefore, the constant current limit circuit 141 operates normally. Moreover, when the over-current status is eliminated, the output current $I_{OUT}$ recovers its status from the over-current status to the normal status, and the constant current limit circuit 141 is turned off so that the output voltage $V_{OUT}$ of the power IC 1 rapidly recovers to the normal voltage and is in a stable voltage status.

Figure 7:
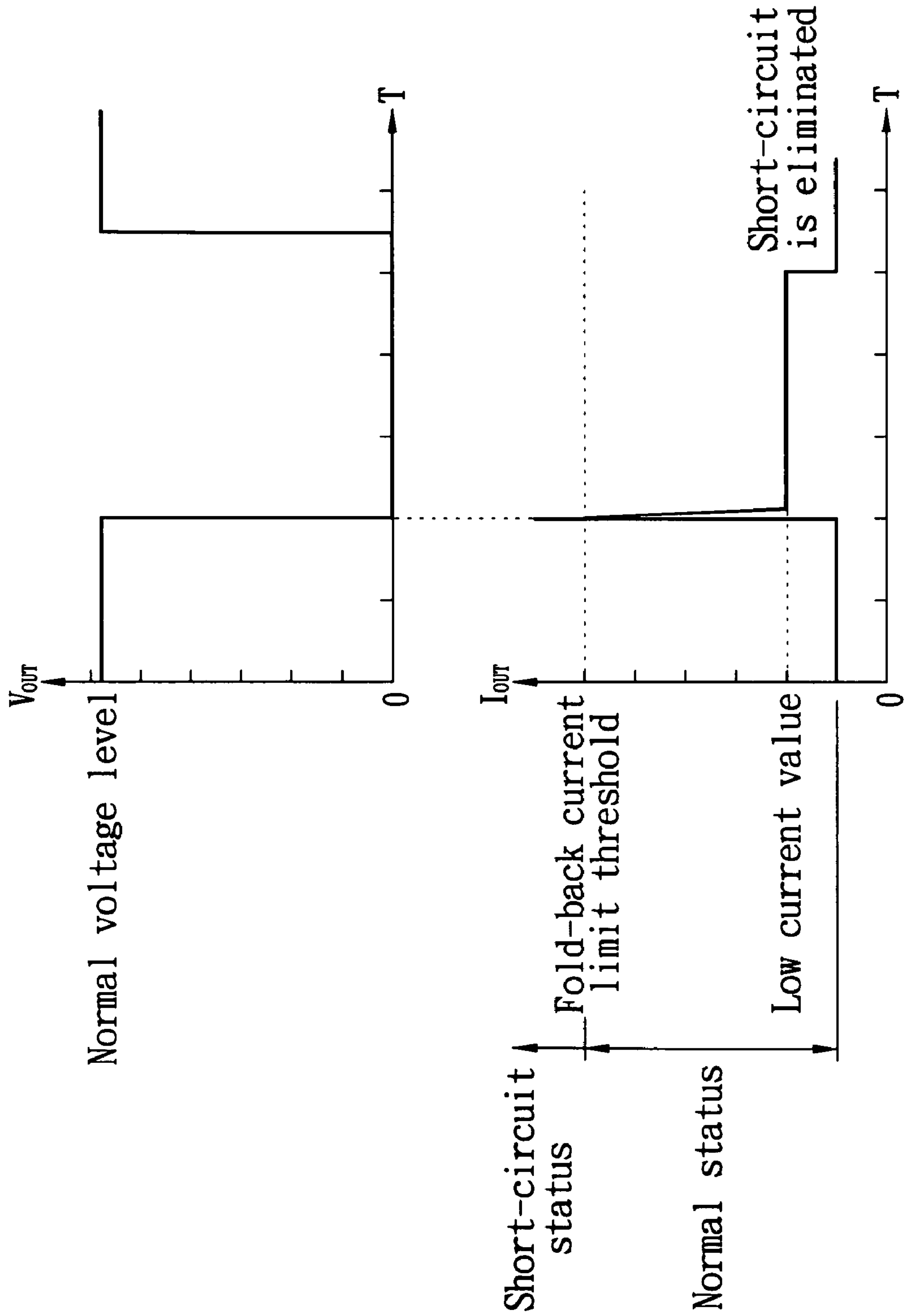
FIG. 7 is a schematic diagram of the transient analysis of the output status when the fold-back current limit mechanism is operated.

Reference is made to FIG. 7, which shows a schematic diagram of the transient status analysis of the output status when the fold-back current limit mechanism is operated. As shown in FIG. 7, when the output current $I_{OUT}$ changes its status from the normal status to the short-circuit status (the output current $I_{OUT}$ is larger than the fold-back current limit threshold), the fold-back current limit mechanism is started to fold back the output current $I_{OUT}$ to a low current value. The output voltage $V_{OUT}$ is descended to zero. Therefore, the fold-back current limit circuit 142 operates normally. Moreover, when the short-circuit status is eliminated, the fold-back current limit circuit 142 is turned off so that the output voltage $V_{OUT}$ of the power IC 1 rapidly recovers to the normal voltage and is in a stable voltage status.

The present invention uses a two-stage current limit mechanism to clamp the over-current to a lower constant current value and fold back the current to lower the current for prevent the power IC from being damaged due to abnormal current, such as over-current, short-circuit, or the peak current when the power is turned on, etc. The power loss is decreased, and the latch-up symptom does not occur. Furthermore, when the over-current or the short-circuit status is eliminated, the output of the power IC has a short recovery time so that the output voltage rapidly recovers to the normal status.

Moreover, in addition to achieve the over-current protection and short-circuit protection, the area of the power IC is reduced in the CMOS manufacturing process due to the required components is reduced.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A power IC with an over-current protection, for receiving an input voltage and converting the input voltage into an output voltage to a load, comprising:

a power transistor for providing an output current to the load;

a feedback circuit for detecting the output voltage to generate a feedback signal;

an output control unit for receiving the feedback signal and calculating the feedback signal and a reference voltage source to generate a voltage control signal to control the power transistor; and an over-current protection circuit having a constant current limit threshold and a fold-back current limit threshold for controlling the power transistor to adjust the output voltage and the output current;

wherein, when the output current is larger than the constant current limit threshold, the over-current protection circuit clamps the output current to a constant current value to lower the output voltage to a rated value, and when the output current is larger than the fold-back current limit threshold, the over-current protection circuit limits the output current to a low current value to descend the output voltage to zero.

2. The power IC with an over-current protection as claimed in claim 1, wherein the power transistor is a P-channel MOSFET.

3. The power IC with an over-current protection as claimed in claim 1, wherein the feedback circuit and the output control unit form a negative feedback control.

4. The power IC with an over-current protection as claimed in claim 3, wherein the output control unit is an error amplifier, a non-inverted input terminal of the error amplifier receives the feedback signal, an inverted input terminal of the error amplifier is connected with the reference voltage source, and the error amplifier generates the voltage control signal after the feedback signal and the reference voltage source is performed an error-amplifying operation.

5. The power IC with an over-current protection as claimed in claim 1, wherein the fold-back current limit threshold is determined according to an estimated short-circuit current.

6. An over-current protection circuit, applied to a power IC, wherein the power IC receives an input voltage and controls a power transistor to output an output voltage and an output current according to a feedback signal of a feedback circuit, comprising:

a constant current limit circuit having a constant current limit threshold;

wherein the constant current limit circuit comprises:

a sensing transistor for sensing current flowing through the power transistor to form a sensing current;

a switch transistor used as a turn-on/turn-off switch of the over-current protection circuit; and a voltage level control unit for shifting a voltage level according to the sensing current and a bias current to control the switch transistor; and a fold-back current limit circuit having a fold-back current limit threshold and connected with the feedback circuit for cooperating with the constant current limit circuit according to a divided voltage generated from the feedback circuit;

wherein, when the output current is larger than the constant current limit threshold, the constant current limit circuit clamps the output current to a constant current value to lower the output voltage to a rated value, and when the output current is larger than the fold-back current limit threshold, the fold-back current limit circuit cooperates with the constant current limit circuit to limit the output current to a low current value to lower the output voltage to zero.

7. The over-current protection circuit as claimed in claim 6, wherein the power transistor is a P-channel MOSFET.

8. The over-current protection circuit as claimed in claim 6, wherein the feedback circuit forms a negative feedback control.

9. The over-current protection circuit as claimed in claim 6, wherein the current of the power transistor is almost equal to the output current.

10. The over-current protection circuit as claimed in claim 6, wherein the voltage level control unit controls the switch transistor to be conducted when a source-to-gate voltage of the switch transistor is larger than a threshold voltage of the switch transistor so that the constant current limit circuit and the fold-back current limit circuit further controls the power transistor to adjust the output voltage and the output current.

11. The over-current protection circuit as claimed in claim 6, wherein the fold-back current limit threshold is determined according to an estimated short-circuit current.

12. An over-current protection method, applied to a power IC, wherein the power IC receives an input voltage and controls a power transistor to output an output voltage and an output current according to a feedback signal of a feedback circuit, comprising:

outputting the output voltage in a stable manner to fix the output current of the power transistor;

detecting the output current, wherein, when the output current is larger than a fold-back current limit threshold, the power transistor is controlled to limit the output current to a low current value to descend the output voltage to zero; and detecting the output current, wherein, when the output current is larger than a constant current limit threshold, the power transistor is controlled to clamp the output current to a constant current value to descend the output voltage to a rated value.

13. The over-current protection method as claimed in claim 12, wherein the feedback circuit forms a negative feedback control.

14. The over-current protection method as claimed in claim 12, wherein the fold-back current limit threshold is determined according to an estimated short-circuit current.

15. The over-current protection method as claimed in claim 12, further comprising a step of providing a sensing transistor for detecting the output current.

* * * * *